(12) United States Patent
Chen et al.

(10) Patent No.: US 7,623,456 B1
(45) Date of Patent: Nov. 24, 2009

(54) APPARATUS AND METHOD FOR IMPLEMENTING COMPREHENSIVE QOS INDEPENDENT OF THE FABRIC SYSTEM

(75) Inventors: Yung-Chin Chen, Saratoga, CA (US); Abhijit V. Warkhedi, San Jose, CA (US); Ketan A. Padwekar, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 731 days.

(21) Appl. No.: 10/639,062

(22) Filed: Aug. 12, 2003

(51) Int. Cl.
*H04J 3/14* (2006.01)
*H04L 12/28* (2006.01)
*H04L 12/56* (2006.01)

(52) U.S. Cl. ...................... 370/235; 370/412
(58) Field of Classification Search .............. 370/229, 370/235, 389, 412
See application file for complete search history.

(56) References Cited

U.S. PATENT DOCUMENTS

| | | | |
|---|---|---|---|
| 5,898,687 A | 4/1999 | Harriman et al. ............ 370/390 |
| 6,351,454 B1 | 2/2002 | Crocker et al. ............. 370/235 |
| 2003/0048792 A1* | 3/2003 | Xu et al. ..................... 370/400 |
| 2003/0174701 A1* | 9/2003 | Angle et al. ................ 370/390 |
| 2004/0081184 A1* | 4/2004 | Magill et al. ............... 370/413 |
| 2005/0078673 A1* | 4/2005 | Sakamoto et al. .......... 370/389 |

* cited by examiner

*Primary Examiner*—Kevin C Harper
(74) *Attorney, Agent, or Firm*—Campbell Stephenson LLP

(57) ABSTRACT

An apparatus and method for implementing comprehensive QOS independent of the fabric system is disclosed. According to one embodiment, a system is provided comprising a switching medium, a plurality of line cards, a first scheduler associated with an ingress line card, and a second scheduler associated with an egress line card and communicatively coupled with the first scheduler. According to another embodiment, a line card is provided comprising a plurality of input buffers, a plurality of output buffers, output buffer status logic coupled to the output buffers operable to produce output buffer status information corresponding to each output buffer, a first scheduler coupled to the input buffers and operable to select data from the input buffers based upon the output buffer status, and a second scheduler coupled to the output buffers and operable to select data from the output buffers in accordance with Quality of Service requirements.

20 Claims, 3 Drawing Sheets

APPARATUS AND METHOD FOR IMPLEMENTING COMPREHENSIVE QOS INDEPENDENT OF THE FABRIC SYSTEM

TECHNICAL FIELD

The present invention relates to communications devices generally, and in particular to the transfer of data frames over line cards.

BACKGROUND

In a communications network, switching devices ("switches") receive data at one of a set of input interfaces and forward the data to one or more of a set of output interfaces. Users typically require that such switching devices operate as quickly as possible in order to maintain a high data rate. Switches are typically data link layer devices that enable multiple physical network (e.g., local area network (LAN) and/or wide area network (WAN)) segments to be interconnected into a single larger network. In the most general sense, these types of networks transport data in the form of frames. A frame is a logical grouping of information sent as a unit over a transmission medium. Frames typically include header and/or trailer information used, for example, for routing, synchronization, and error control. The header and trailer information encapsulates payload data contained in the frame. The terms cell, datagram, message, packet and segment are also used to describe logical information groupings at various layers of the Reference Model for Open Systems Interconnect (OSI reference model) and in various terms of art. As used herein, the term "frame" should be understood in its broadest sense, and can encompass other terms such as cell, datagram, message, packet and segment.

FIG. 1 illustrates a simplified block diagram of a switching network 100, such as a LAN switching network. In this example, a switch 102 includes a switching medium 110 or "switch fabric" and multiple line cards 120 and 130. The switch connects various network devices 122, 124, 132, and 134 to each other through switching medium 110 via line cards 120 and 130. Network devices 122, 124, 132, and 134 can, in general, include a variety of different devices including computer systems, output devices, storage devices, communications devices, or other network components such as routers, other switches, and even other networks. For example, line cards 120 and 130 generally take the form of an I/O interface card that typically performs data frame analysis as part of the switching process. Switching medium 110 can be implemented in a variety of ways. Common types of switching mediums include single-bus architectures, shared-memory architectures, and crossbars.

It will be noted that the variable identifier "N" is used in FIG. 1 (and in other parts of this application) to more simply designate the final element (e.g., line card 130) of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

FIG. 2 illustrates an exemplary network switching scheme. In support of a crossbar 200, switching medium 110 includes one or more input buffers 210 and one or more output buffers 220. In a typical implementation, there are input and output buffers for each port in the switching medium. Consequently, input and output buffers can be associated with particular line cards by virtue of the buffers' association with a particular port. In this example, data frames to be transferred from line card 120 to line card 130 are first queued in queue 240 of line card 120. Once a data frame is ready for transmission, it is serialized and transmitted across a serial channel to switching medium 110 where it is deserialized and received by input buffer 210. The data frame is then transmitted across crossbar 200 to an output buffer corresponding to the appropriate port of exit, in this case output buffer 220. From output buffer 220, the data frame is serialized and transmitted to the line card corresponding to output buffer 220 port, in this case line card 130. The data is typically deserialized and received in a queue such as queue 250.

Basic QoS support is attempted in a conventional system by prioritizing traffic classes independently at the ingress and the egress line cards of the switch. Specifically, packets are prioritized before their entry into the fabric port and then independently prioritized after transiting the fabric port on the egress side. There are at least two problems with this approach. First, high priority packets from one line card are treated no differently from low priority packets from another line card. So, the prioritization in effect is local to the ingress line cards and QoS is diluted from an overall system perspective. Second, fair allocation of bandwidth to each ingress line card is not assured at every egress line card such that one line card may effectively starve out another one.

Most fabrics deployed today are what are known as input-queued or input-output queued (hybrid) crossbars. These fabrics cannot service a packet from every ingress port in a single arbitration round, and therefore, require some packets to be buffered when multiple packets need to be serviced simultaneously. These types of crossbars are primarily used in practice due to scalability and cost-effectiveness reasons.

Another type of fabric is a pure output queued crossbar. This fabric is able to service all N fabric ports in a single arbitration round allowing it to buffer data only at its outputs. Thus, there is only a single point of congestion—the output queue, allowing scheduling to be performed solely at the egress queues. Here, packets can be prioritized and bandwidth may be fairly distributed in any desired manner. Unlike the input-queued/hybrid systems, the pure output queued crossbar is generally impractical to build.

It is increasingly desirable that switches support network administrative features, for example, quality of service (QoS) features such as fair bandwidth allocation between traffic classes and across fabric sources, prioritization and low latency queues, and other similar features. However, many primitive fabrics do not provide such support, and modifying the fabrics to include such support is not generally feasible. Accordingly, it is desirable to implement comprehensive QoS features over a primitive fabric system without having to modify the fabric itself.

SUMMARY

Disclosed is an apparatus and method for implementing comprehensive QOS independent of the fabric system. According to one embodiment, a system is provided comprising a switching medium, a plurality of line cards, a first scheduler associated with an ingress line card, and a second scheduler associated with an egress line card and communicatively coupled with the first scheduler. According to another embodiment, a line card is provided comprising a plurality of input buffers, a plurality of output buffers, output buffer status logic coupled to the output buffers operable to produce output buffer status information corresponding to each output buffer, a first scheduler coupled to the input buffers and operable to select data from the input buffers based upon the output buffer status, and a second scheduler coupled to the output buffers and operable to select data from the output buffers in accordance with Quality of Service requirements.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features and wherein.

DETAILED DESCRIPTION

The following text and Figures are intended to provide a detailed description of exemplary embodiments of the invention. However, the scope of the invention should not be limited to the examples provided herein, but rather should be defined by the claims provided at the end of the description.

In accordance with the present invention, line cards utilize a master-slave scheduling architecture along with virtual buffer status (VBS) information to provide QoS features over a switch fabric. A master scheduler, residing on an egress line card, schedules frames out of virtual input queues (VIQs) of the egress line card. The master scheduler collects and distributes virtual buffer status information to a slave scheduler residing on an ingress line card. Using the VBS information, the slave scheduler on the ingress line card schedules frames from virtual output queues (VOQs) to the switch fabric. A VOQ on the ingress line card is a logical extension of a VIQ on the egress line card by virtue of the virtual buffer status information provided from the master scheduler. Accordingly, the present invention provides for the support of a number of QoS features over a primitive switch fabric independently of the switch fabric itself.

Figure 1:
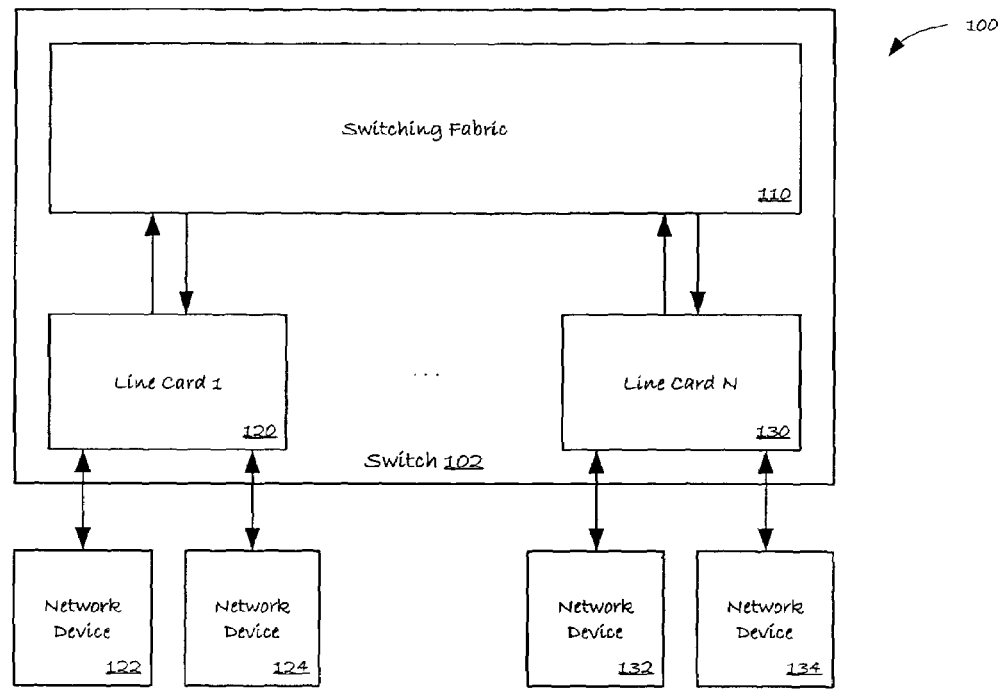
FIG. 1 is a block diagram of a switching network.
Figure 2:
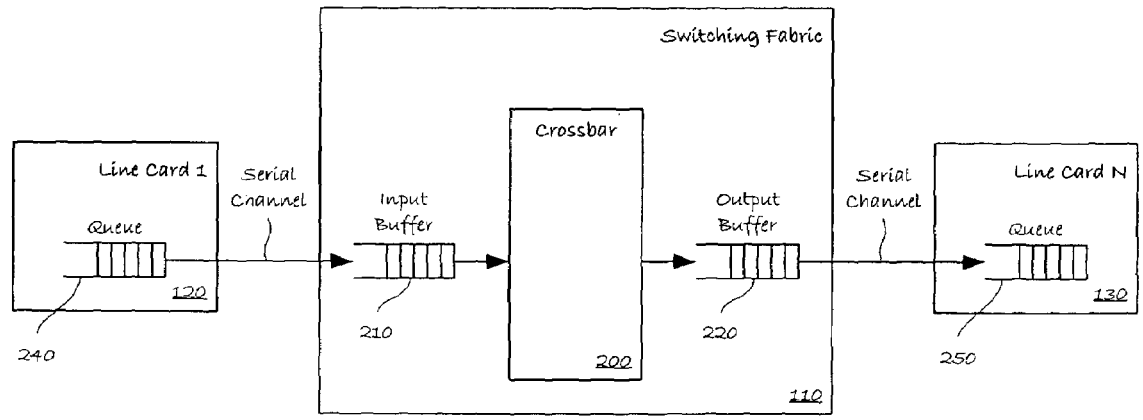
FIG. 2 is a block diagram of several features of a prior art crossbar-based switching scheme.
Figure 3:
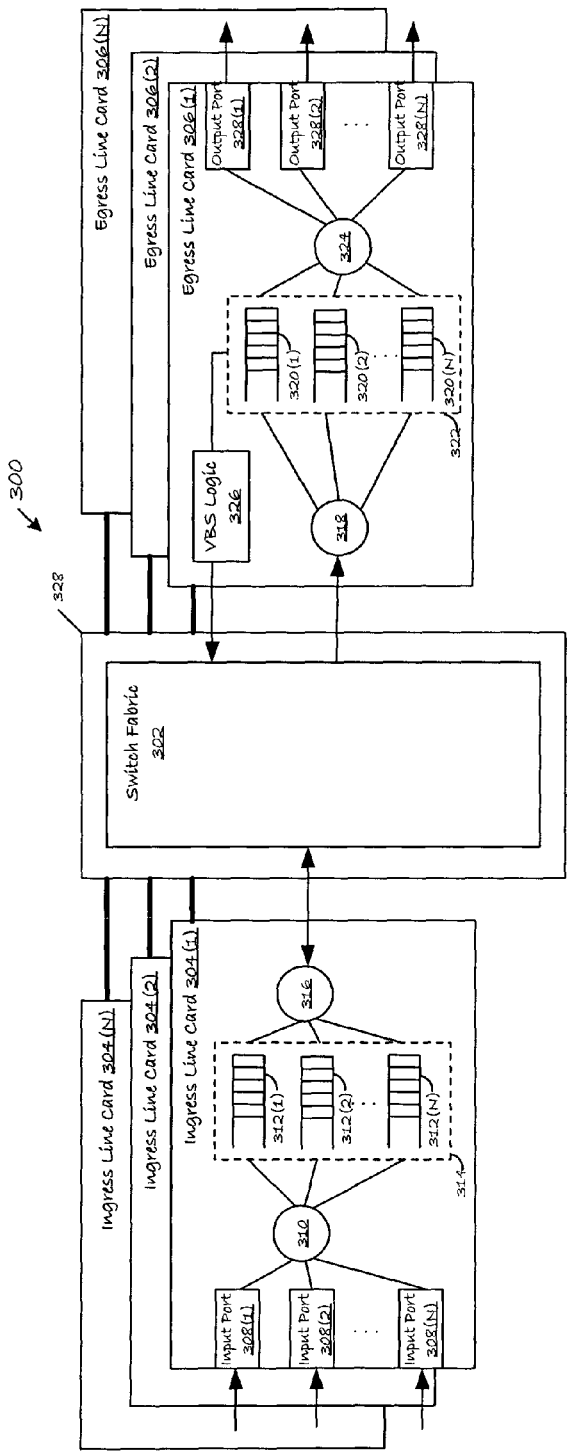
FIG. 3 is a block diagram of line cards coupled to a fabric switch in accordance with the present invention.

FIG. 3 is a simplified block diagram of one type of network device, a switch 300, employing the present invention. Switch 300 includes a switch fabric 302 and N (e.g., 32) removable network circuit cards 304 and 306. In the presently described embodiment, network circuit cards 304 and 306 are line cards that provide one or more interfaces for switch 300. Accordingly, network circuit cards 304 and 306 will be referred to as line cards 304 and 306. It is recognized that various hardware and software components associated with switch 300 are not shown in order to aid clarity.

Line card 304 carries data to switch fabric 302, and thus is referred to as an ingress line card. Similarly, line card 306 carries data from switch fabric 302, and is referred to as an egress line card. It is well known that the functions of an ingress line card and an egress line card may be combined and implemented on a single card. Accordingly, the illustration of separate egress and ingress line cards is intended for clarity and should not be taken as limiting.

In accordance with the present invention, removable network circuit cards 304 and 306 include logic for providing quality of service (QoS) features over switch fabric 302. Because the architecture for providing such QoS features is distributed over network circuit cards 304 and 306, switch 300 is scalable. The design of switch fabric 302 is simplified, which results in a smaller die size. This, for example, allows switch 300 to be scaled to support an increased port density. In addition, because network circuit cards 304 and 306 are removable, a network device using a primitive switch fabric (i.e., a fabric that does not support one or more QoS features) can be upgraded to support QoS features without modifying the fabric. Furthermore, the present invention provides for flexibility in the choice of scheduling algorithms used to implement QoS features by simply modifying the line cards. It will be recognized that although the present invention is described with reference to a fabric based networking device, the present invention can be utilized in other architectures such as a bus-based system architecture.

Ingress line card 304 includes N (e.g., 16) input ports 308, each coupled to a virtual output queue (VOQ) manager 310. VOQ manager 310 is coupled to a number of VOQs 312 of a memory 314. Each VOQ 312, in turn, is coupled to a scheduler 316. Virtual output queues 312 generally provide storage for one or more frames and can be organized according to any number of schemes. In the presently described embodiment, VOQs 312 are grouped according to frame destination (e.g., destination line card), and for each frame destination are organized by frame class. For example a VOQ 312(1) and a VOQ 312(2) are both associated with a first destination. In addition, VOQ 312(1) is associated with a first traffic class (e.g., Expedited Forwarding) and VOQ 312(2) is associated with a second traffic class (e.g., Assured Forwarding).

Expedited Forwarding (EF) is described in "An Expedited Forwarding PHB," Networking Group RFC 2598, (June 1999), which is incorporated herein by reference in its entirety and for all purposes. Assured Forwarding (AF) is described in "Assured Forwarding PHB Group," Networking Group RFC 2597 (June 1999), which is incorporated herein by reference in its entirety and for all purposes. Similarly, a VOQ 312(3) and a VOQ 312(4) are both associated with a second destination, and VOQ 312(3) is associated with the first traffic class while VOQ 312(4) is associated with the second traffic class, and so on. It will be recognized that such an organizational scheme is not limited to two destinations and two classes, but may be extended to any number of destinations and classes.

In operation, frames arrive at ingress line card 304 from various network devices via input ports 308. VOQ manager 310 analyzes each frame to determine which VOQ 312 the frame should be forwarded to. For example, VOQ manager 310 can analyze a frame header to determine a corresponding destination and traffic class of the frame and forward the frame to an appropriate VOQ 312 accordingly.

From VOQ 312, frames are sent to a VIQ 320 though switch fabric 302 via scheduler 316. In scheduling the order in which frames are sent from VOQs 312 to VIQs 320, scheduler 316 utilizes virtual buffer status (VBS) information received from a master scheduler (e.g., scheduler 324). For example, scheduler 316 has access to VBS information for each VIQ 320 to which each frame in VOQ 312 is destined. The VBS information includes a representation of the data occupancy level of a given VIQ 320. Frames destined for VIQs 320 having more available memory space are selected by scheduler 316 prior to frames destined for buffers having less available memory space.

In one embodiment, the data occupancy level of each VIQ 320 is represented by a number between 0 and 3, inclusive. A data occupancy level of 3 for a given VIQ 320 queue represents that the queue is 75% to 100% occupied. A data occupancy level of 2 represents that the queue is 50% to 75% occupied. A data occupancy level of 1 represents that the queue is 25% to 50% occupied. A data occupancy level of 0 represents that the queue is 0% to 25% occupied. It will be recognized that the data occupancy level scheme of the present invention can be implemented with any degree of granularity, and thus, should not be limited to the data occupancy levels described herein.

In one embodiment of the present invention, scheduler 316 utilizes a round robin algorithm on the data occupancy level as at least one method of selecting frames from VOQs 312. For example, scheduler 316 selects frames from a VOQ 312 destined for a VIQ 320 having the lowest occupancy level, followed by the next highest occupancy level, and so on. With reference to the data occupancy scheme described above, scheduler 316 selects frames destined for VIQs 320 having a data occupancy level of 0 prior to selecting frames destined for VIQs 320 having a data occupancy level of 1, and so on, with frames destined for VIQs 320 having a data occupancy level of 3 selected last. In one embodiment, scheduler 316 can cycle successively through each data occupancy level 0, 1, 2, 3, etc. Additionally, scheduler 316 can also interrupt the cycle if at any time in the cycle a frame is awaiting transmission to a lesser occupied VIQ 320. Also, it is recognized that scheduler 316 can implement a number of additional scheduling algorithms in conjunction with the aforementioned round robin algorithm.

Once frames have been selected from VOQ 312, frames are sent from ingress line card 304 to Switch fabric 302. Switch fabric 302 can be implemented in a variety of ways, as is well known to those of ordinary skill in the art. For example, fabric 302 can include port modules (not shown) that receive frames from a switch fabric input buffer (not shown). Switch fabric 302 can also include output port modules (not shown) having arbiter circuits (not shown) that control access to the output port modules. When an arbiter acknowledges a requested transfer, a corresponding input port module sends a frame into the fabric. The output port module that acknowledged the transfer receives the frame and sends it to an output buffer coupled to egress line cards 306. The interconnection of input ports and output ports of switch fabric 302 is typically achieved using data busses, arbitration buses, multiplexers, and the like. In the presently described embodiment, switch fabric 302 is a primitive fabric system not able to support a variety of QoS features (e.g., contains only a round robin scheduler). Accordingly, the support of such QoS features as fairness, etc., are provided via line cards 304 and 306 in accordance with the present invention.

Data leaves switch fabric 302 and arrives at an egress line card 306. Egress line card 306 includes a VIQ manager 318 coupled to a number of virtual input queues (VIQs) 320 in a memory 322. Each VIQ 320 is, in turn, coupled to a scheduler 324 and a VBS Logic 326. In the illustrated embodiment, scheduler 324 is coupled to a number of output ports 328. In one embodiment of the present invention, there exists a one-to-one correspondence between each VIQ 320 and each VOQ 312 and the organization of VIQ 320 and VOQ 312 is similar.

An in-bound data stream of frames arrives at VIQ manager 318, is analyzed, and transferred to a VIQ 320. For example, VIQ manager 318 can analyze a frame header to determine a corresponding class and source line card and forward the frame to an appropriate VIQ 320 accordingly. Frames are selected from VIQ 320 by scheduler 324 according to any number of scheduling algorithms. For example, in one embodiment of the present invention, scheduler 324 selects frames from VIQs 320 in accordance with a Differentiated Services Architecture described in "An Architecture for Differentiated Services", Networking Group RFC 2475 (December 1998) (hereinafter "DiffServ Architecture") which is incorporated herein by reference in its entirety and for all purposes.

From VIQs 320 frames are sent to one or more network devices via scheduler 324. Scheduler 324 can be configured to schedule and send frames in accordance with any number of QoS features, examples of which are provided in FIG. 5, discussed herein.

It can thus be seen that utilizing a slave scheduler 316, a master scheduler 324 and providing VBS feedback information, any number of QoS features can be supported. In one exemplary embodiment such QoS features include the provision of fair bandwidth allocation between traffic classes and across different sources, as well as prioritization and low latency queues.

In providing VBS information to scheduler 316, VBS logic 326 monitors the status of each VIQ 320. Specifically, VBS logic 326 monitors the degree to which each VIQ 320 is full and provides this VBS information (e.g., the data occupancy level of the respective queue) to all line cards 304. In one embodiment, VBS information is distributed from an egress line card 306 to each ingress line card 304 in an in-band fashion. For example, each output port (not shown) of egress line card 306 can combine the VBS information with the data stream prior to sending the data stream to fabric 302 and each ingress line card 304. Similarly, in one embodiment, a dedicated bus 328 coupling each ingress line card 304 to each egress line card 306 can also be utilized to transfer the VBS information from an egress line card 306 to all ingress line cards 304. By providing VBS information to each line card 304, congestion of data at a given VIQ 320 is likely reduced.

In one embodiment of the present invention, a given VOQ is identified by a source fabric port, a destination fabric port, and a traffic class. Similarly, a given VIQ is identified by a source fabric port, a destination fabric port, and a traffic class. With such an identification scheme, VBS information is in one-to-one correspondence between each VIQ and each VOQ, which allows fairness across all the sources (e.g., each ingress line card 304.)

In another embodiment, each VIQ can be identified by only a destination fabric port and a traffic class. In this scheme, VBS feedback is in a one-to-many correspondence between the VIQs and VOQs. For example, VBS feedback information from a VIQ associated with a single traffic class is propagated to all sources of the same traffic class.

Figure 4:
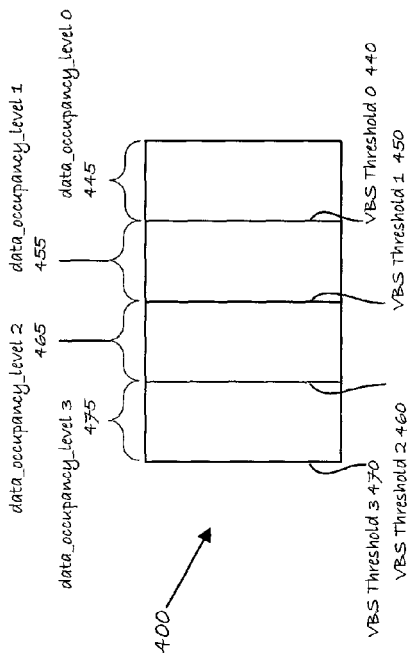
FIG. 4 illustrates an example of memory organization of memory on an egress line card in accordance with one embodiment of the present invention.

FIG. 4 illustrates an example of the organization of memory 322. Memory 322 is logically divided into one or more virtual input queues (VIQ) as needed. In this example, a single VIQ 400 for queuing frames is illustrated.

VIQ 400 has VBS threshold values 440, 450, 460, and 470. The VBS threshold values indicate threshold percentages of VIQ 400 filled with data. VBS logic 326 uses the threshold values to determine the data occupancy levels of a VIQ. In one embodiment, VBS threshold values (representing percentage of buffer filled) 440, 450, 460, and 470 are compared against the actual data occupancy of VIQ 400 in order to generate a data occupancy level. For example, in FIG. 4, four threshold values are illustrated, each having a corresponding data_occupancy_level. A VBS_threshold_0 440 equals 25% of the total memory allocated to VIQ 400. A data_occupancy_level_0 445 represents that between 0% and 25% of the memory of VIQ 400 is occupied. A VBS_threshold_1 450 equals 50% of the total memory allocated to VIQ 400. A data_occupancy_level_1 455 represents that between 25% and 50% of the memory of VIQ 400 is occupied. A VBS_threshold_2 460 equals 75% of the total memory allocated to VIQ 400. A data_occupancy_level_2 465 represents that between 50% and 75% of the memory of VIQ 400 is occupied. A VBS_threshold_3 470 equals 100% of the total memory allocated to VIQ 400. A data_occupancy_level_3 475 represents that between 75% and 100% of the memory of VIQ 400 is occupied. In one embodiment, the VBS_threshold values are stored in programmable threshold registers (e.g., threshold registers 514 of FIG. 5). Accordingly, the values of the VBS_thresholds can be easily changed along with the granularity of the data_occupancy_levels.

In the presently described embodiment, a VBS control circuit (e.g., VBS control circuit 510 of FIG. 5) determines the data_occupancy_level by first determining the actual data occupancy of VIQ 400 and then comparing the actual data occupancy to the threshold values. For example, if the actual data occupancy of VIQ 400 is 18%, comparing the actual data occupancy level with VBS_thresholds 440, 450, 460, and 470 results in a finding that VIQ 400 is between 0% and 25% full. Accordingly, data_occupancy_level_0 is provided for VIQ 400. In one embodiment of the present invention, a pointer structure is used to track the location of frames within VIQ 400.

Figure 5:
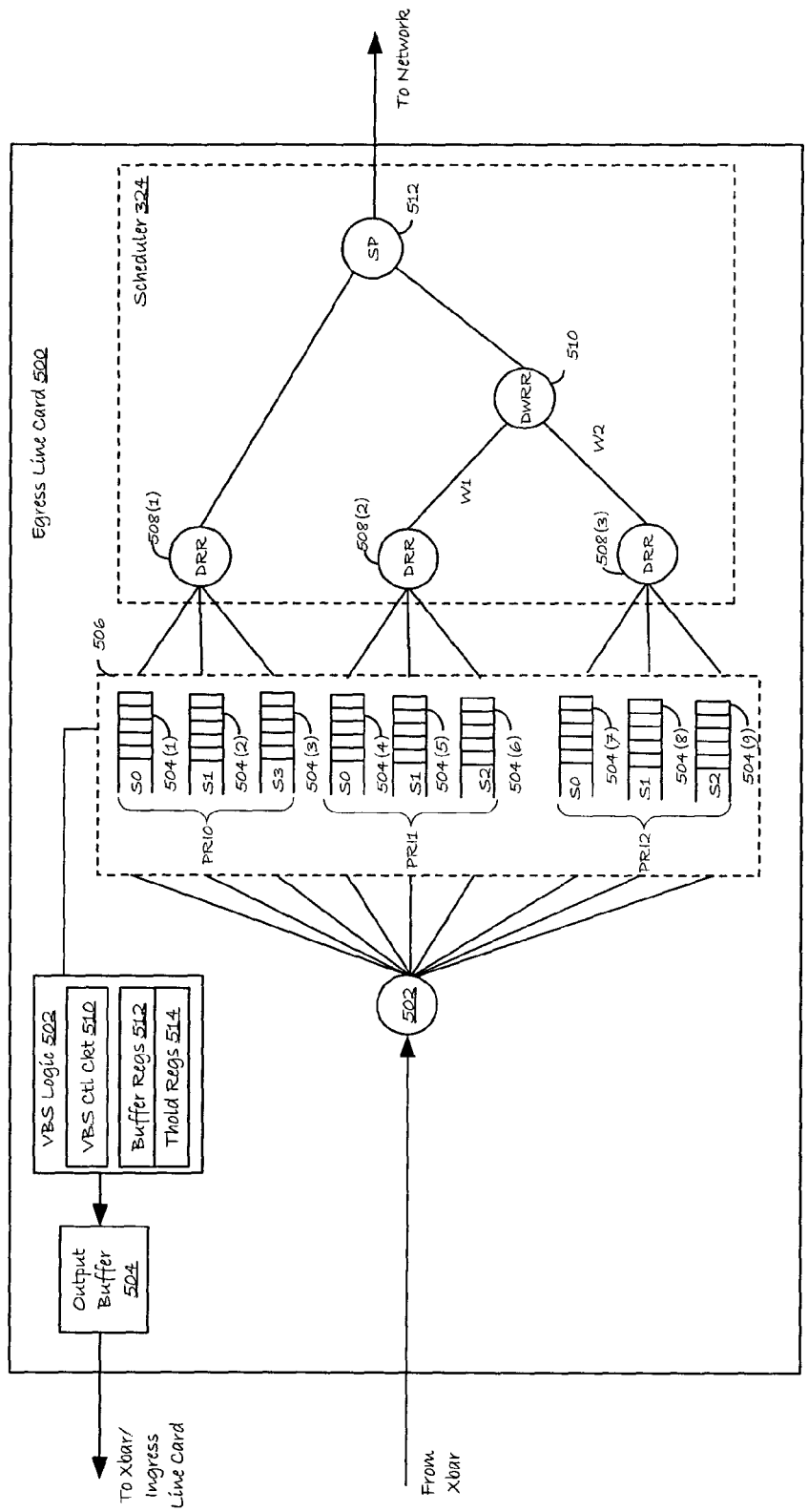
FIG. 5 is a block diagram of an egress line card in accordance with one embodiment of the present invention.

FIG. 5 illustrates a simplified block diagram of an egress line card 500 which, in conjunction with ingress line card 304, provides QoS support for Differentiated Services, which is further described in "DiffServ Architecture". Generally, DiffServ provides a simple method of classifying and prioritizing services of various applications. Although many traffic classes are possible, two are most common: Expedited Forwarding (EF), and Assured Forwarding (AF). EF minimizes delay and jitter and provides the highest level of aggregate quality of service. AF traffic is not delivered with as high a priority as EF, but traffic is not usually dropped.

Egress line card 500 includes a VIQ manager 502 coupled to a number of virtual input queues (VIQs) 504 in a memory 506. In the presently described embodiment, VIQs 504 are arranged according to source and priority. For example, VIQ 504(1) is configured to receive priority 0 data from source 0 (e.g., an ingress line cards 304 of FIG. 3). VIQ 504(2) is configured to receive priority 0 data from source 1, and so on. In one embodiment of the present invention, priority 0 is reserved for Expedited Forwarding (EF) Traffic while all other priorities are reserved for Assured Forwarding (AF) Traffic.

VIQs 504 of a given priority are each coupled to a deficit round robin (DRR) scheduler 508. In this way, frames of the same priority can be selected in a round robin fashion. For example all priority 0 VIQs (VIQ 504(1), VIQ 504(2), and VIQ 504(3)) are coupled to DRR scheduler 508(1). Similarly, all priority 1 VIQs (VIQ 504(4), VIQ 504(5), and VIQ 504(6)) are coupled to DRR scheduler 508(2), and so on. For a given priority, DRR can ensure the fairness across different sources. It will be recognized that, although the present invention is described with respect to three priorities, each associated with three VIQs, the present invention can be extended to any number of priorities and VIQs.

Schedulers 508(2) and 508(3) (i.e., schedulers associated with AF traffic) are coupled to a deficit weighted round robin scheduler 610. In this way, weights can be provided within AF traffic to provide for bandwidth distribution of the AF traffic. For example, priority 1 traffic is assigned a weight W1 and priority 2 traffic is assigned a weight W2. Depending on the relationship between W1 and W2, scheduler 510 can allocate more bandwidth to priority 1 traffic or priority 2 traffic. Scheduler 510 is, in turn, coupled to strict priority scheduler 512.

Also coupled to strict priority scheduler 512 is scheduler 508(1), the scheduler associated with priority 0 traffic. Strict priority scheduler 512 prioritizes EF traffic (e.g., priority 0 traffic) over AF traffic (priority 1 and priority 2 traffic) so that all frames in VIQs 504(1)-504(3) are transmitted before frames in VIQs 504(4)-504(9). In this way, egress line card provides for prioritization of EF traffic over AF traffic, resulting in low latency, low jitter, and assured bandwidth for EF traffic.

Thus, utilizing a master-slave scheduling architecture along with virtual buffer status (VBS) feedback, line cards in accordance with the present invention provide QoS features over a primitive switch fabric. Because the architecture for providing such QoS features is distributed over network circuit cards, a primitive network device is made scalable. For example, using the present invention, the design of a switch fabric is simplified, which results in a smaller die size. This, in turn, allows a switch to be scaled to support an increased port density. In addition, because line cards in accordance with the present invention are easily replaceable, a network device using a primitive switch fabric can be upgraded to support QoS features without modifying the fabric. Furthermore, the present invention provides for flexibility in the choice of scheduling algorithms used to implement QoS features by simply modifying the line cards.

Although the present invention has been described with respect to specific preferred embodiments thereof, various changes and modifications may be suggested to one skilled in the art and it is intended that the present invention encompass such changes and also that the modifications fall within the scope of the claims.

What is claimed is:

1. A system comprising:
   a switching medium;
   a plurality of line cards coupled to said switching medium;
   a first scheduler associated with an ingress line card of said plurality of line cards;
   a second scheduler associated with an egress line card of said plurality of line cards and communicatively coupled with said first scheduler; and
   status logic within said egress line card of said plurality of line cards, wherein
      said second scheduler is communicatively coupled with said first scheduler utilizing said status logic,
      said ingress line card comprises a first data structure,
      said first data structure comprises a virtual output queue,
      said egress line card comprises a second data structure,
      said second data structure comprises a first virtual input queue and a second virtual input queue, said status logic comprises status logic configured to transfer status information from said egress line card to said ingress line card, said status information comprises status information associated with said first virtual input queue, and said status information comprises status information associated with said second virtual input queue.

2. The system of claim 1, wherein, said plurality of line cards are configured to provide a quality of service feature utilizing said first scheduler and said second scheduler.

3. The system of claim 2, wherein said first data structure comprises a logical extension of said second data structure.

4. The system of claim 2, wherein, said first scheduler comprises a first scheduler configured to schedule transfer of data from said first data structure, and said second scheduler comprises a second scheduler configured to schedule transfer of data from said second data structure.

5. The system of claim 4, wherein, said status information associated with said second data structure comprises a data occupancy level of said second data structure.

6. The system of claim 5, wherein, said first scheduler configured to schedule transfer of data from said first data structure comprises first scheduler configured to schedule transfer of data from said first data structure utilizing said data occupancy level of said second data structure.

7. The system of claim 6, wherein, said second scheduler configured to schedule transfer of data from said second data structure comprises a second scheduler configured to schedule transfer of data from said second data structure utilizing a quality of service parameter.

8. The system of claim 1, wherein, said first scheduler comprises a slave scheduler within said ingress line card and said second scheduler comprises a master scheduler within said egress line card.

9. The system of claim 1, wherein said switching medium comprises an input-queued crossbar.

10. The system of claim 2, wherein said quality of service feature comprises traffic prioritization and bandwidth allocation.

11. The system of claim 10, wherein said quality of service feature comprises Differentiated Services traffic prioritization.

12. The system of claim 2, wherein, said plurality of line cards comprises a plurality of ingress line cards, and said quality of service feature comprises traffic prioritization and bandwidth allocation across all of said plurality of ingress line cards.

13. A method comprising:

transferring data between an ingress line card and an egress line card within a switching system;

transferring status information between status logic within said egress line card, and said ingress line card;

providing a quality of service feature in response to said transferring status information;

generating said status information utilizing said status logic within said egress line card; and scheduling data from a second structure utilizing a second scheduler associated with said egress line card, wherein said ingress line card comprises a first data structure, said first data structure comprises a virtual output queue, said egress line card comprises said second data structure, said second data structure comprises a first virtual input queue and a second virtual input queue, said transferring said status information comprises transferring a data occupancy level of said first virtual input queue from said status logic within said egress line card to said ingress line card, and said transferring said status information comprises transferring a data occupancy level of said second virtual input queue from said status logic within said egress line card to said ingress line card.

14. The method of claim 13, wherein, said transferring data between an ingress line card and an egress line card comprises scheduling data from said virtual output queue utilizing a first scheduler associated with said ingress line card.

15. The method of claim 13, wherein, said providing a quality of service feature comprises providing traffic prioritization.

16. The method of claim 13, wherein, said providing a quality of service feature comprises providing bandwidth allocation between said egress line card and a plurality of ingress line cards, wherein said plurality of ingress cards comprise said ingress line card.

17. A switching system comprising:

means for transferring data between an ingress line card and an egress line card within said switching system;

means for transferring status information between status logic within said egress line card, and said ingress line card;

means for providing a quality of service feature in response to a transfer of said status information;

means for generating said status information utilizing said status logic within said egress line card; and means for scheduling data from a second structure utilizing a second scheduler associated with said egress line card, wherein said ingress line card comprises a first data structure, said first data structure comprises a virtual output queue, said egress line card comprises said second data structure, said second data structure comprises a first virtual input queue and a second virtual input queue, said means for transferring said status information comprises means for transferring a data occupancy level of said first virtual input queue from said status logic within said egress line card to said ingress line card, and said means for transferring said status information comprises means for transferring a data occupancy level of said second virtual input queue from said status logic within said egress line card to said ingress line card.

18. The switching system of claim 17, wherein, said means for transferring data between an ingress line card and an egress line card comprises means for scheduling data from said virtual output queue utilizing a first scheduler associated with said ingress line card.

19. The switching system of claim 17, wherein, said means for providing a quality of service feature comprises means for providing traffic prioritization.

20. The switching system of claim 17, wherein, said means for providing a quality of service feature comprises means for providing bandwidth allocation between said egress line card and a plurality of ingress line cards including said ingress line card.

* * * * *

UNITED STATES PATENT AND TRADEMARK OFFICE
CERTIFICATE OF CORRECTION

PATENT NO. : 7,623,456 B1 Page 1 of 1
APPLICATION NO. : 10/639062
DATED : November 24, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this

Fourteenth Day of December, 2010

David J. Kappos
*Director of the United States Patent and Trademark Office*